United States Patent [19]

Bromley et al.

[11] Patent Number: 4,462,594
[45] Date of Patent: Jul. 31, 1984

[54] VIDEO GAME WITH CONTROL OF RATE OF MOVEMENT OF GAME OBJECTS

[75] Inventors: Eric Bromley, West Simsbury; Robert A. Schenck, Hebron, both of Conn.

[73] Assignee: Coleco, Industries, Inc., West Hartford, Conn.

[21] Appl. No.: 430,351

[22] Filed: Sep. 29, 1982

[51] Int. Cl.³ .............................................. A63F 9/22
[52] U.S. Cl. ......................... 273/85 G; 273/DIG. 28
[58] Field of Search ............ 273/85 G, DIG. 28, 1 E

[56] References Cited

U.S. PATENT DOCUMENTS 3,778,058 12/1973 Rausch ............................. 273/85 G
4,114,882 9/1978 Mau ................................. 273/85 G
4,148,014 4/1979 Burson ............................. 273/85 G Primary Examiner—Richard C. Pinkham
Assistant Examiner—Leo P. Picard
Attorney, Agent, or Firm—Costas, Montgomery & Dorman

[57] ABSTRACT

A video game including a player operated device for controlling the velocity and direction of movement of a game object. The game player may generate a pulse train having a pulse repetition rate proportional to the desired velocity of the game object. A numerical value of the pulse rate as a function of a clock signal is established, and the numerical value is utilized to change the address of the game object in a video memory so that in successive frames of a video display the game object moves across the display screen.

14 Claims, 15 Drawing Figures

VIDEO GAME WITH CONTROL OF RATE OF MOVEMENT OF GAME OBJECTS

FIELD OF THE INVENTION

This invention relates to video games and more particularly relates to providing player control or selection of the rate of movement of an object on the display screen.

BACKGROUND OF THE INVENTION

Video games basically comprise a microprocessor utilized as a central processing unit (CPU), a video display control, a memory adapted to store a game program and a video memory for storing picture elements of a video display. The picture elements of a display are addressed and fetched from memory in accordance with the cathode ray tube (CRT) beam location.

In some cases, the system utilizes a full screen memory, that is, a discrete memory address is provided for every discrete display location of the display, either pixel position or line segment position. Such a system is disclosed in U.S. Pat. No. 4,301,503. In another type of system, a pointer indicative of a display location addresses and reads a picture element from a pattern library. Such a system is disclosed in U.S. Pat. No. 4,243,984. A video display procesor (VDP), which together with a dynamic video random access memory (RAM) operates in this manner, is marketed by Texas Instruments as a 9928A video display processor.

To create object movement on the display, in systems using a full screen memory, the addresses of the picture elements are changed periodically, usually during the time of vertical retrace. To create object movement in systems of the second type, the object location in the pointer is changed to a new display location, and the pointer addresses the object in a pattern library at the appropriate beam location.

In either case, the address of the object in the video RAM is changed by the CPU as it receives game player input as to movement of the object. Usually, a game player utilizes a joystick type instrument to control the direction of movement of the object. Such joystick may close switches indicative of coordinate directions of movement. Periodically, the CPU is responsive to the closure condition of the joystick switches. On this particular basis, or some factor thereof, the CPU will rewrite the address of the object in the video RAM. As the address of the object is periodically changed, the object appears to move on the video display in succeeding displays.

In these systems, movement of the object on the screen is at a rate determined by the game program. The object will move a predetermined number of pixels per display frame. There is no known system where rate of movement of an object may be varibly selected or determined by a game player. In some video games, such as disclosed in U.S. Pat. No. 4,114,882, velocity of a moving object is increased as the game continues, at the option of the players, to increase the skill level required. However, the player has no direct control of the velocity of movement of an object.

Also, a video driving game known as TURBO allows some velocity control by positioning an automobile in the horizontal coordinate one pixel per pulse where pulses are generated in accordance with positional movement of a steering wheel, and the steering wheel may be turned at a variable rate. However, this differs from the present invention, where a binary number is generated by counting pulses as a function of a periodic signal, and utilized to control the rate of movement of a video object.

The present invention provides a new dimension in video games in providing a game player with velocity and bi-directional control over an object to be moved on the video screen.

SUMMARY OF THE INVENTION

The invention is embodied in a video game comprising a microprocessor which is the central processing unit (CPU) of the system, a video display processor (VDP) having a random access memory which stores video display picture elements in addresses initially derived from a game program stored in a cartridge read only memory (ROM), a system ROM which stores sub-routines and game player controllers which provide inputs to the CPU. In accordance with the invention, the game controller(s) includes a means, preferably in the form of a rotatable member(s), which is manipulated by a game player(s) to provide a pulse rate signal indicative of the speed of rotation of the member and also the direction of rotation. The rate signal is converted to a numerical value as a function of time, and the direction of rotation is determined. Dependent upon the program or game rules of a particular video game, the numerical value may be used to control the velocity of a moving object, the angular orientation, or other parameters.

Generally, the numerical value representing the pulse rate is determined as a function of a periodic signal which may be a video refresh, VR, signal occurring at or after each vertical retrace. The numerical value may be established as a number per VR signals, or alternatively, the numerical value may be established as the number of VR signals per pulse signal.

An object of this invention is to provide a new parameter under player control in a video game.

Another object of this invention is to provide a new and improved method and apparatus for a player of a video game to have variable velocity control over a game object.

A further object of this invention is to provide a new and improved apparatus and method for allowing the player of a video game to select velocity of a video display object in additon to direction control.

The features of the invention which are believed to be novel are particularly pointed out and distinctly claimed in the concluding portion of this specification. The invention, however, together with further objects and advantages thereof, may best be appreciated by reference to the following detailed description taken in conjunction with the drawings.

DETAILED DESCRIPTION OF THE ILLUSTRATED EMBODIMENTS

Figure 1:
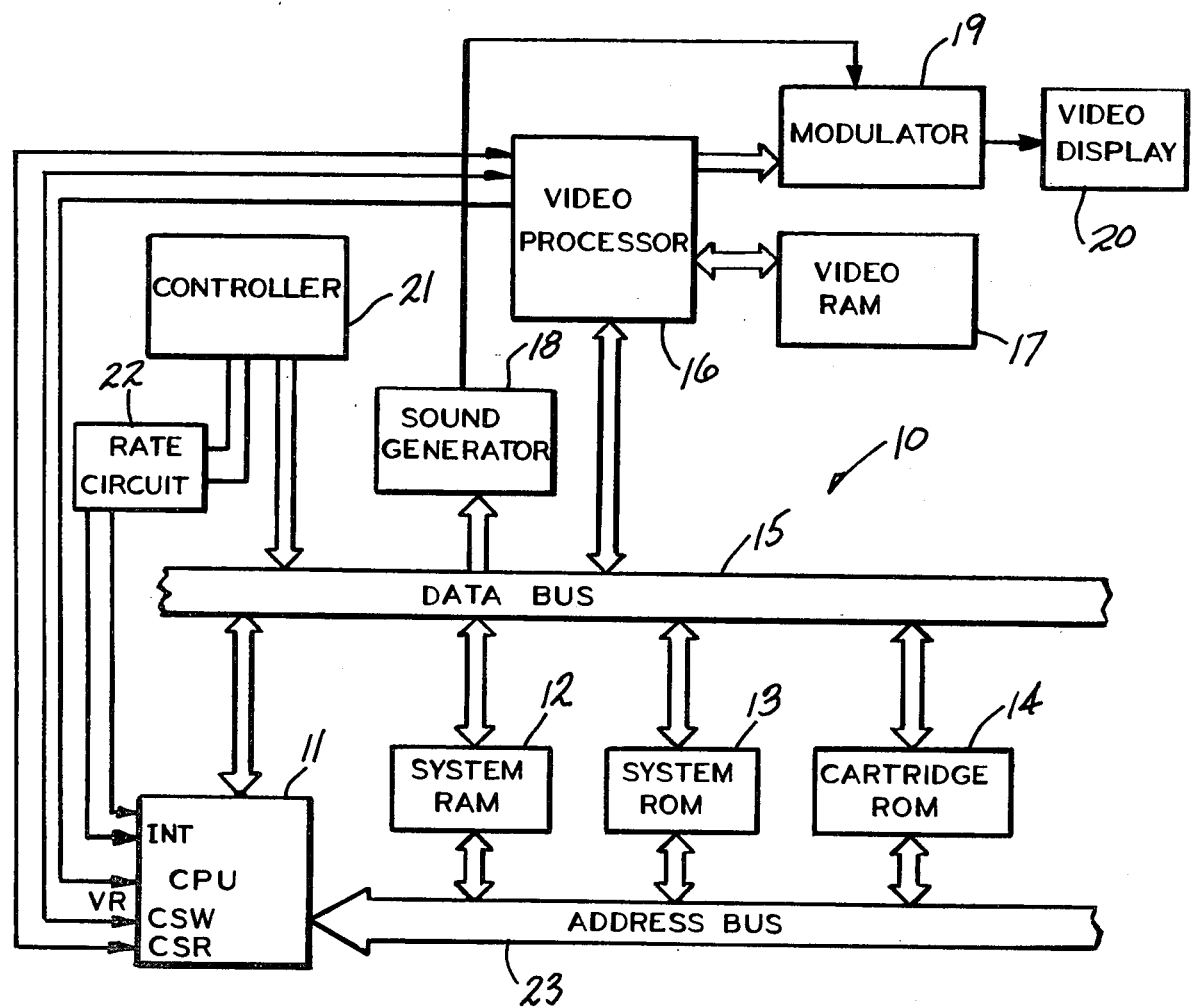
FIG. 1 is a block diagram of a video game which embodies the invention.

FIG. 1 exemplifies in block form a system 10 for creating video displays in which the invention may be embodied. The system comprises a central processing unit (CPU) 11, which may be a Zilog Z-80a microprocessor; a system random access memory (RAM) 12; a system read only memory (ROM) 13; and an input device which may be a cartridge read only memory (ROM) 14. The CPU 11 accesses all commands and game programs and supplies data over a data bus 15 to a video display processor 16 (VDP). VDP 16 has associated therewith a RAM 17 which is addressable by the CPU only through VDP 16. The system also comprises a sound generator 18, which provides an input to a modulator 19. The modulator 19 receives a scan signal from video processor 16. The modulator applies a composite video signal to a video display 20, which is a cathode ray tube display, usually a home television set. A player operated controller 21 supplies information to CPU 11, indicative of directional motion of an object to be displayed, and/or alpha-numeric keyboard information. The controller includes a direction control in the form of a joystick, as disclosed in co-pending application Ser. No. 402,435, filed July 28, 1982, the disclosure of which is incorporated by reference. The controller may include a rate pulse generating circuit 22, which generates a pulse signal indicative of a player selected rate or the rate circuit may be a separate entity. This signal may be utilized independently or in conjunction with the player operated direction control. The CPU 11 will periodically update video RAM 17 when permitted to do so by the video processor 16.

Cartridge ROM 14 defines specific video images for a particular game, and the game rules. System ROM 13 contains video processing sub-routines and controller input sub-routines. The system RAM 12 contains temporary information peculiar to the particular games, such as scores, position variables, location of players, etc. CPU periodically updates the image or elements of images in video RAM to be displayed in accordance with data from the controller and game program. The video processor 16 periodically permits the CPU to read from and write to the video RAM 17 upon occurrence of read (CSR) and write (CSW) signals. The CPU 11 addresses RAM 12, and ROM's 13 and 14, via an address bus 23. CPU 11 reads from RAM 12, ROM's 13 and 14, and writes to RAM 12 via data bus 15.

At the end of every video frame display, video processor 19 provides a video refresh signal VR to CPU 11. This occurs about every one-sixtieth of a second. This may be utilized as a clock signal in the present invention. Circuit 22 generates a rate signal as selected by the game player and supplies such rate signal to an interrupt terminal (INT) of CPU 11. When this occurs, CPU 11 will determine the rate, and establish a numerical representation thereof, and determine direction. Information is now stored which comprises a binary number indicative of rate and direction of movement of a game object of member 20. This information or any part thereof may then be utilized to update the video display in accordance with the game program.

The joystick of controller 21 is adapted to close one or two of four switches which are ninety degrees apart to define eight directions of movement. Responsive to switch closure, the CPU 11 changes the addresses of picture element patterns in video RAM a predetermined number of pixel positions per frame of display in accordance with the game program.

Figure 2:
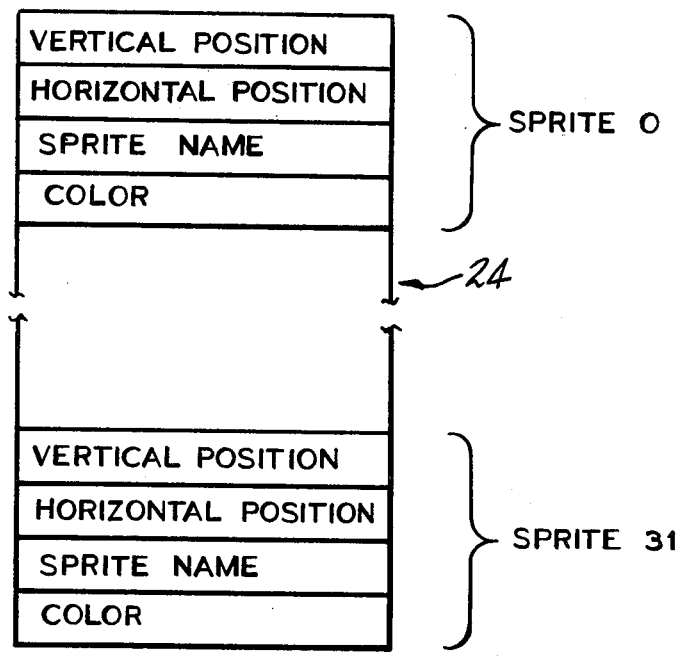
FIG. 2 is a block diagram of an attribute table entry in the video RAM of FIG. 1 showing four bytes of memory.

The video display processor is preferably a Texas Instruments Incorporated 9928A Video Display Processor, which is described in U.S. Pat. Nos. 4,243,984 and 4,262,302, and a publication of Texas Instruments Incorporated, entitled "Preliminary TMS 9928A, TMS 9929A Video Display Processors, Product Brief", the disclosures of which are incorporated herein by reference. In this system, movable objects are termed "Sprites" and are identified as shown in FIG. 2 in a sprite attribute entry in a sprite attribute table 24 in video RAM 20. The sprites are defined within a sprite pattern of eight bytes of eight pixels each, and are located on the screen in accordance with the horizontal and vertical coordinates of their sprite attribute table entry. Each sprite has an attribute table entry which gives vertical coordinate position, horizontal coordinate position, sprite name or number, and sprite color pattern. The sprite name or number is a pointer to a sprite pattern in a sprite pattern generator table or library in video RAM 20. A similar sprite attribute entry is maintained in CPU 11 or RAM 12, as hereinafter described. When the display beam location coincides with, or approaches vertical and horizontal attributes of a sprite, the name pointer is used to address the particular sprite in the sprite library for display. As shown, there are thirty-two sprites in the sprite attribute table. Usually, two or four are movable by game players.

Figure 3:
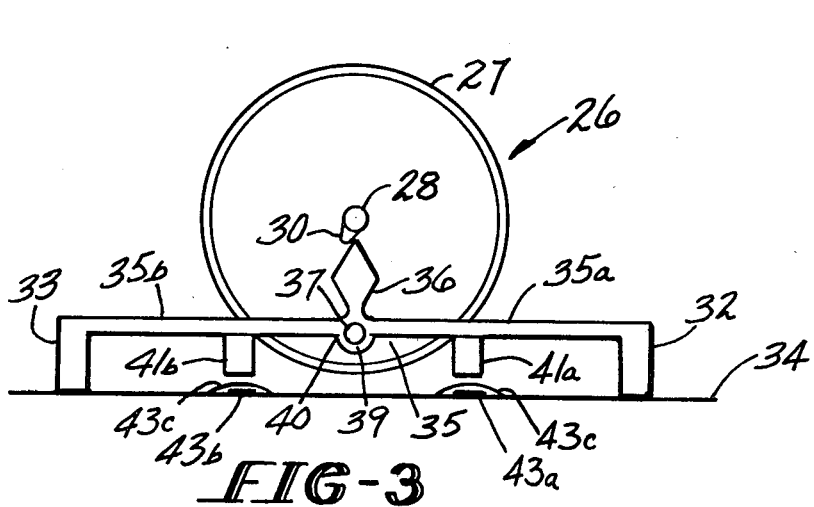
FIGS. 3 and 3a are front elevations of a mechanism, with parts removed, for generating electrical pulses at a rate proportional to rotation of an object.
Figure 4:
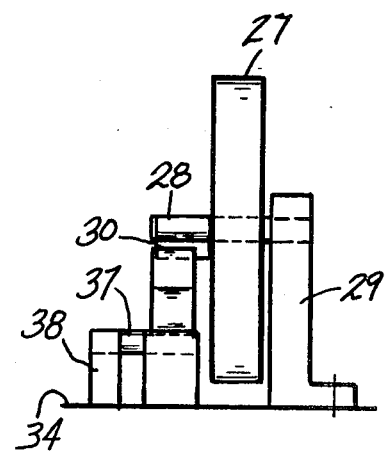
FIG. 4 is a side elevation of the device of FIG. 3.

A mechanism 26 for generating rate signals is shown in FIGS. 3 and 4. Mechanism 26 comprises a rotatable member or spinner 27 operable by a game player. A central shaft 28 on spinner 27 is rotatably mounted to a support 29. Spinner 27 has a cam 30 thereon. A switch actuating member 31 has spaced apart legs 32 and 33 fixed to a surface 34, and a resilient bridging member 35 extending therebetween. An actuator or follower 36 extending upwardly from member 24 is arranged to be contacted by cam 29 and flex the arms 35a and 35b of resilient bridging member 34. A shaft 37 extends from a support 38 into passage 39 in an enlarged portion 40 of member 35. Spaced intermediate legs 32 and 33 are switch actuating legs 41a and 41b overlying switches 42a and 42b, respectively. The switches 42a and 42b may be of various types, strip metal, buttons, membrane, clicket, etc. As shown, each switch comprises a deformable element 44, adapted to contact a stationary element 43a or 43b. The shaft 37 divides member 35 into arms 35a and 35b, while isolating downward deflection of one arm from the other.

Figure 3A:
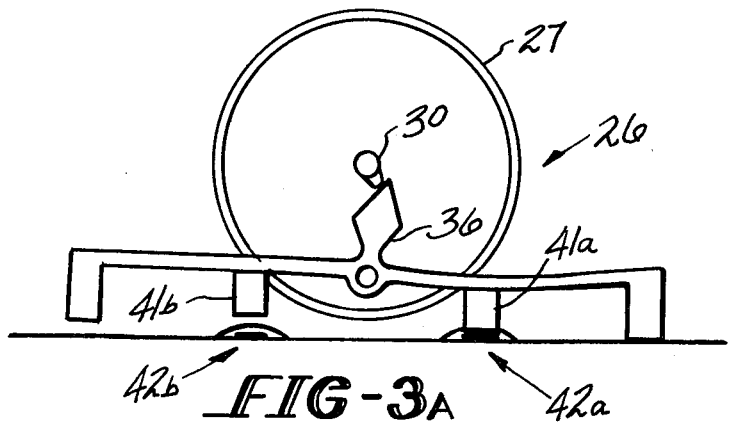
Figure 5:
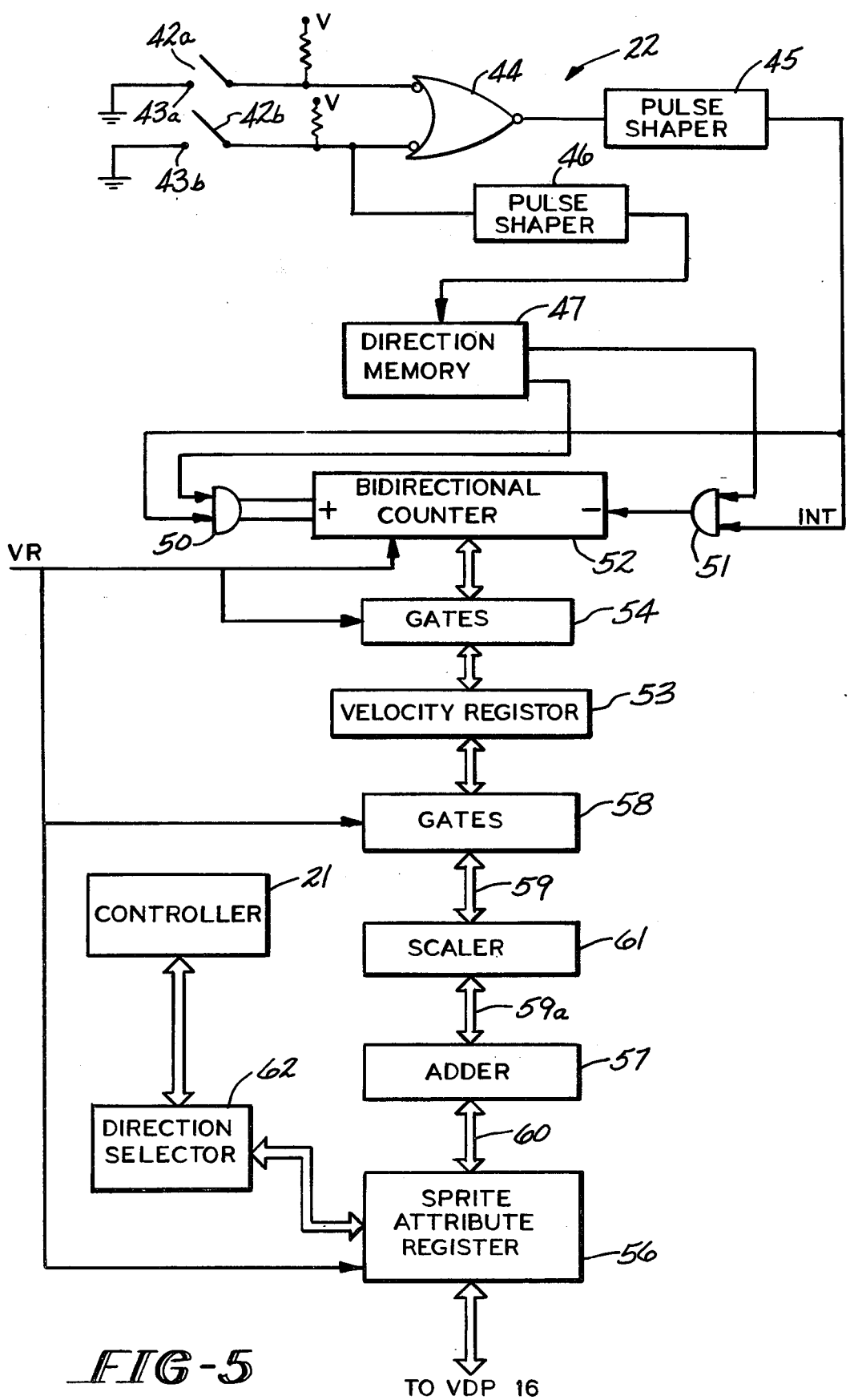
FIG. 5 is a diagram, partly schematic and partly in block form, of a network used in conjunction with the device of FIG. 3 and which establishes a number representative of velocity.

In operation, when spinner 27 is rotated counter-clockwise by a game player, cam 30 will contact actuator 36 and cause it to bend arm 35a, as shown in FIG. 3a. As arm 35a bends downwardly, arm 35b bends upwardly. Actuating leg 41a will close the contact elements of switch 42a. As cam 30 clears actuator 36, arm 35a will spring back to its unstressed position of FIG. 3. Arms 35a and 35b are actually deflectable springs. As spinner 27 rotates, it will cause one of arms 35a and 35b to close a switch 42a or 42b at a rate proportional to the rate of its rotation.

The mechanism of FIG. 3 is preferably a two part (plus shaft 41 and support therefor) construction of molded resilient plastic. The arm 35a and 35b are chosen to be of a thickness which permits the desired resilience. The mechanism 26 is disclosed and claimed in co-pending application Ser. No. 427,771 filed Sept. 29, 1982.

The direction of rotation of spinner 27 as well as the rate of a switch closure may be determined by the rate circuit 22 of FIG. 4. Circuit 22 comprises the switches 42a and 42b adapted to connect points 43a and 43b, respectively, to ground upon closure. This will ground and inverting input of an OR gate 44 which is otherwise at a high voltage. The output of OR gate 44 is applied to a pulse shaper 45 and switch 42b is coupled to a pulse shaper 46. A suitable pulse shaper is hereinafter described.

If either of switches 42a or 42b is repetitively closed due to rotation of spinner 27, a low level signal is applied to gate 44. The output of gate 44 is shaped by pulse shaper 45 and applied as an interrupt signal INT to CPU 11. Simultaneously, the condition of switch 43b is monitored to determine whether it is low (closed) or high (open) to determine the direction of rotation.

If either of switches 42a and 42b is being closed, a train of pulses INT will appear at the output of pulse shaper 45. At the same time, a determination is made as to whether switch 43b is closing. If switch 43b is closing, such condition is sensed by a direction memory 47 which is placed in one state by such closures of switch 43b. If switch 43b is not closing, then direction memory 47 (which may be a flip-flop) is in the other state to signify the opposite direction of rotation.

The INT signal is applied to AND gates 50 and 51. These gates are enabled by a signal from directional memory 47 to either increment or decrement a bi-directional counter 52. Periodically, counter 52 has its content loaded into a velocity register 53 via gates 54 by means of a VR signal, and counter 52 is reset by the VR signal.

Upon occurrence of the VR signal, the content of the velocity register 53 is loaded into an adder 57 via gates 58 and algebraically summed with the vertical or horizontal attributes of a sprite in sprite attribute register 56 via buses 59, 59a, and 60. A scaler 61 is optional. The results of this algebraic addition are reloaded into the sprite attribute register 56. The new attributes define a new display location of the sprite as a function of the velocity of spinner 27. The scaling network 61 may be provided to multiply or divide the count in velocity register 53 prior to adder 57, dependent on the game program.

In this manner the vertical and horizontal attributes of a sprite under player control may be varied as a function of player controlled or selected velocity.

The player may use the joystick or controller 21 to determine whether the velocity signal may be used in conjunction with a vertical or horizontal movement or both as indicated by direction control 62. Directional control 62 is responsive to the position of the joystick of controller 21 to select the vertical or horizontal attribute to which the contents of register 53 is algebraically added. This arrangement is an option where more than one coordinate of movement is permitted in a game program. If this arrangement is utilized, direction memory 47 is not utilized.

This will enable a player to control the velocity of a projectile game object in a chosen direction. Such projectile may be a bullet, a rocket, a pitched baseball, a thrown football, etc.

Upon a CPU write to VDP cycle (CSW) the content of register 56 is transferred to its corresponding sprite attribute entry (FIG. 2) in the sprite attribute table in video RAM 20 through VDP 16 via bus 15.

The circuitry illustrated in FIG. 4, other than the switches and pulse shapers, may be established in the CPU by the game program in the illustrated form or any other form which performs the desired logic. The sprite attribute register 56 may be in the system RAM 12.

In the manner described, the vertical and/or horizontal address of a sprite is changed in the video RAM a number of pixels each VR occurrence dependent upon the rate at which the player rotates spinner 26. The observed velocity of the object will be dependent upon the number of pixel address changes each display frame.

If an INT signal is occurring but at a rate less than VR, the VR signal may be applied as input to counter 52 and the INT signal used as a reset and gating signal. Dependent upon the game program, this arrangement may be used to change the angular position of a game object, or to slow down a movement of an object from a game programmed rate. An arrangement for detecting the VR signal as a function of the INT signal is hereinafter described.

Figure 7:
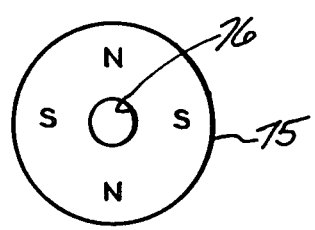
FIG. 7 is a front elevation of a magnet in the rotatable member of FIG. 6.
Figure 6:
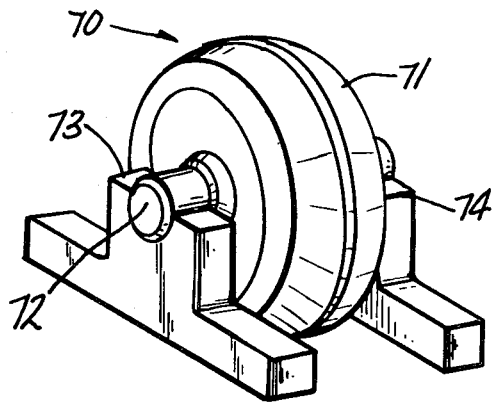
FIG. 6 is a perspective view of another rotatable member which may be utilized in the invention.
Figure 8:
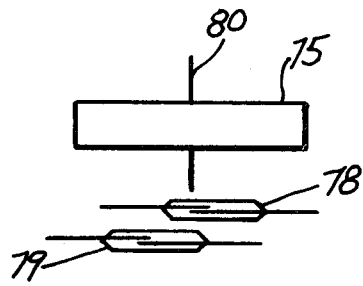
FIG. 8 is a schematic plan view of the magnet of FIG. 6 in relation to a pair of switching devices.

Other devices may be utilized to generate the rate signal INT. An assembly 70 as shown in FIG. 6, comprises a housing member 71, preferably of molded plastic having a shaft 72 extending therethrough which rotatably rests in bearing blocks 73 and 74. A magnetizable member 75, as shown in FIG. 7, has a plurality of equiangularly defined magnetic poles thereon. The magnet 75 has a central bore 76 adapted to receive shaft 72 therethrough. The magnet may be made fast with respect to shaft 72 by an interference fit thereon and/or glued within housing 71. As exemplified in FIG. 8, a pair of switches 78 and 79 are operatively positioned with respect to the magnet so as to be operated by the magnetic field due to any one of the poles. The switches are positioned so that the points of contact are on either side of plane coincident with the axis 80 of the magnet. Each magnetic pole may define an effective angular area of thirty degrees or less in which the magnetic pole is effective to close the switches 78 and 79. The switches are shown as reed switches, but any other type of magnetically actuable switches, such as those operating on the Hall effect, may be utilized.

Figure 9:
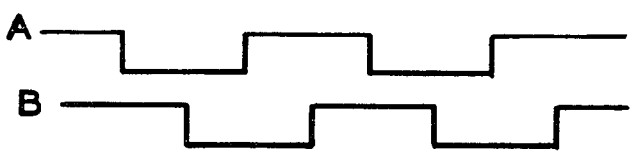
FIG. 9 is a view of the desired wave forms developed when the magnet of FIG. 7 is rotated clockwise.

FIG. 9 exemplifies the wave form developed by the closing of the switches 78 and 79 when the magnet is rotated clockwise as shown in FIG. 6. One terminal of each of switches 78 and 79 will be grounded when the switches are closed on contacts 78a or 79a. Thus, when switch 78 is closed, A will go to a low level, as will be the case upon the closing of switch 79 to develop the trailing (as shown) signal B. The logic of the system is to determine the rate of rotation of magnet 75 from one of wave forms A or B, and to determine the direction of rotation by esensing which wave form is leading the other.

Figure 10:
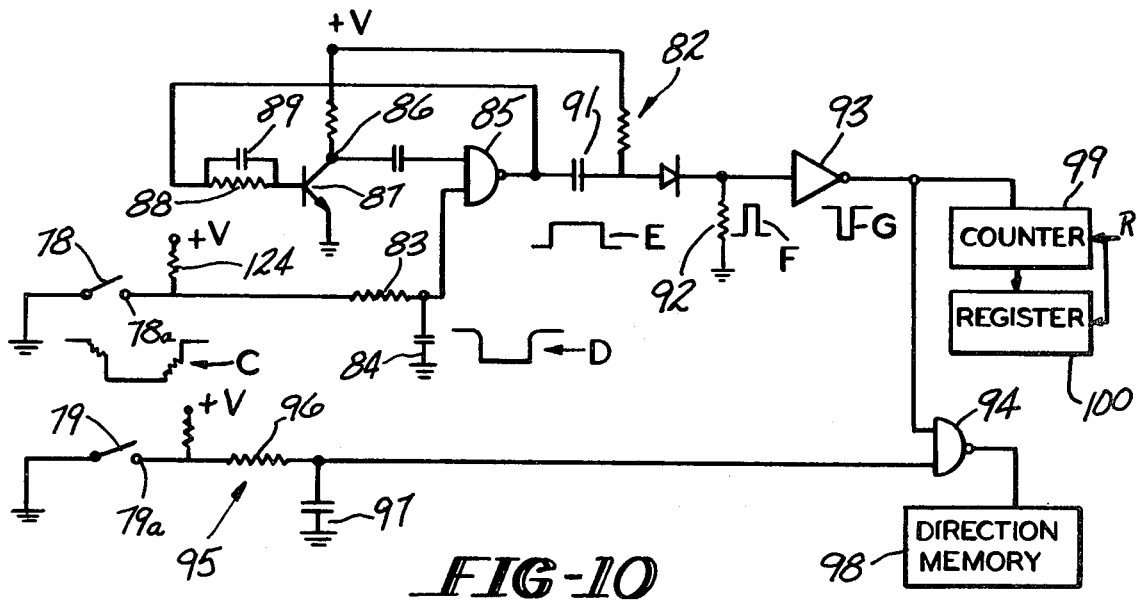
FIG. 10 is a schematic diagram of a circuit which will determine the rate of rotation of the magnet and the direction of rotation thereof.

Reference is now made to the circuit 82 of FIG. 10. When switch 78 closes, a wave form C is developed, which may have ragged leading and trailing edges due to switch bounce. Signal C is applied to an RC circuit comprising resistance 83 and capacitance 84 to remove the bounce indication and provide a signal D. Signal D is applied to a NAND gate 85 which also receives as an input a signal from the collector 86 of a transistor 87. Transistor 87 is normally conducting and therefore furnishes a low input to NAND gate 85. When the signal D is applied to NAND gate 85, there will be an output E from NAND gate 85 which is fed back through an RC circuit comprising resistance 88 and capacitance 89 to turn NAND gate 85 off after a short time delay, which determines the width of wave form E. Wave form E is applied to a differentiating circuit comprising capacitance 91 and resistance 92 to provide the wave form F, which is then inverted to pulses G by an inverter 93. The repetition rate of the pulse wave form G is indicative of the speed of rotation of the housing 71 and magnet 75 therein, and thus provides a speed or velocity rate signal.

To determine the direction of rotation, pulse G is applied to a NAND gate 94 together with a signal, or absence of signal, from switch 79. A signal from switch 79 is applied to a pulse stretching circuit 95 comprising resistance 96 and capacitance 97. If, upon occurrence of the first G pulse, the output of circuit 95 is low, gate 94 will go high. This will indicate that the B wave form of inverter 93 is low and therefore, wave form B leads wave form A. In the example set forth, this would indicate that magnet 75 was rotating counter clockwise. If switch 79 is not closed, the output of NAND gate 94 will be low, indicating that wave form A leads wave form B. The output of circuit 95 is also applied to NAND gate 94, together with the wave form G. If there is a coincidence of a low output from circuit 95 and wave form G, there will be an output from NAND gate 96 indicative of the fact that wave form A leads wave form B and therefore, rotation of the magnet 75 is clockwise. This signal from gate 94 is stored in a direction memory 47. The binary state of the memory will indicate the direction of rotation of magnet 75.

The pulses of the G wave form are applied to a counter 99 to determine the number of pulses per unit time as herebefore explained. The counter 99 will transfer the number therein to a velocity register 100 upon occurrence of a clock signal VR. The counter 99 will be reset.

Figure 12:
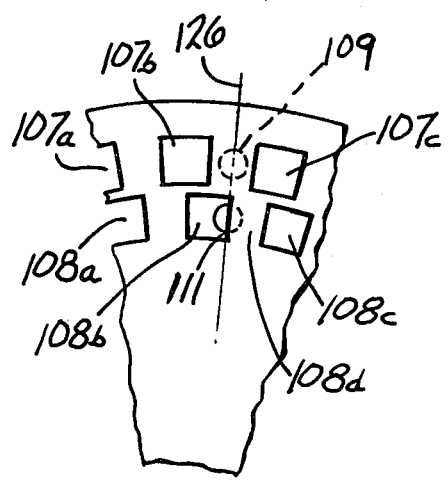
FIG. 12 is an enlarged view of a portion of FIG. 10.
Figure 11:
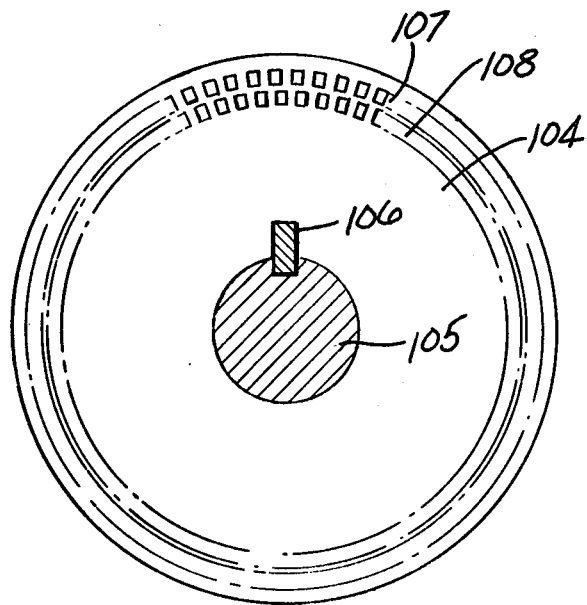
FIG. 11 is a view of another rotatable member which may be utilized in the invention.
Figure 13:
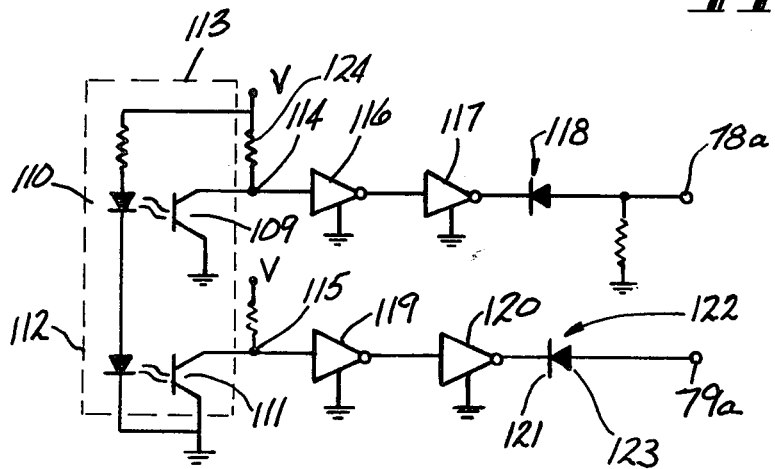
FIG. 13 is a schematic diagram of a light sensing circuit used in conjunction with the device of FIGS. 11 and 12.

A photo-electric technique of implementing the invention is disclosed in FIGS. 11–13.

A disk 104 is mounted to a rotatable shaft 105 by a key 106. Defined in a first annulus in disk 104 about shaft 105 is a first pattern of equiangularly spaced apertures or windows 107, and a second annulus of equiangularly spaced apertures or windows 108. The windows of each annulus are defined by radii from the center of shaft 105 and are angularly offset as between the inner annulus and the outer annulus. The windows of the inner annulus have a side edge coinciding with the center of a window of the outer annulus.

Referring to FIGS. 12 and 13, a first photo-electric switching means in the form of a photo-transistor 109 responsive to a light emitter in the form of a light emitting diode (LED) 110, and a second photo-electric switching means in the form of photo-transistor 111 responsive to a light emitter in the form of LED 112, are positioned in a housing indicated in broken line 113. Housing 113 is positioned over disk 104 so that transistor 109 and LED 110 are aligned on either side of disk 100 over one pattern of windows. Transistor 111 and LED 112 are radially aligned with transistor 109 and LED 100 over the other patterns of windows. As shaft 105 with disk 104 thereon rotate, the transistors will sequentially conduct as the windows of patterns 107 and 108 expose each photo-transistor to its light emitter.

FIG. 12 shows an enlarged view of windows 107a–107c and 108a–108c with transistors 109 and 111 positioned over the patterns 107 and 108. The transistors 109 and 111 are conductive with low collector voltage at points 114 and 115 when exposed to their respective LED's. When point 114 is low, inverter 116 has a high output and inverter 117 has a low output. This is equivalent to switch 78 (FIG. 10) being closed. In fact, the anode of diode 118 is connected to the stationary terminal 78a of switch 78 of FIG. 10, and the switch eliminated.

The collector 115 of transistor 111 is connected to an inverter 119 which is in turn connected to an inverter 120. The cathode 121 of diode 122 is connected to the output of inverter 117. The anode 123 of diode 122 is connected to terminal 79a of switch 79 (FIG. 10). When transistor 109 is conducting, the output of inverter 116 is high and the output of inverter 117 is low. Current will flow from V through resistance 124 to ground through inverter 116, and terminal 78a will go low.

Assume that disk 104 is to be rotated clockwise as shown in FIG. 11, and the transistors 109 and 111 are radially aligned along line 126. As transistor 109 is exposed to its LED 110 through window 107b, it will commence to conduct and there will be a pulse applied to terminal 78a and there will be a low output from inverter 113 at this time. At this same time, transistor 111 will be exposed through window 108b to its LED 112 and there will be a low voltage at terminal 78a. These conditions indicate a clockwise rotation of disk 104.

If the direction of rotation of disk 104 is to be counterclockwise, when transistor 109 is first exposed to its LED 110 through window 107c, transistor 111 will be occluded from its LED 112 by wall 108d between windows 108b and 108a and the voltage output of inverter 120 will be high. These conditions signify a counter-clockwise rotation of disk 104.

Figure 14:
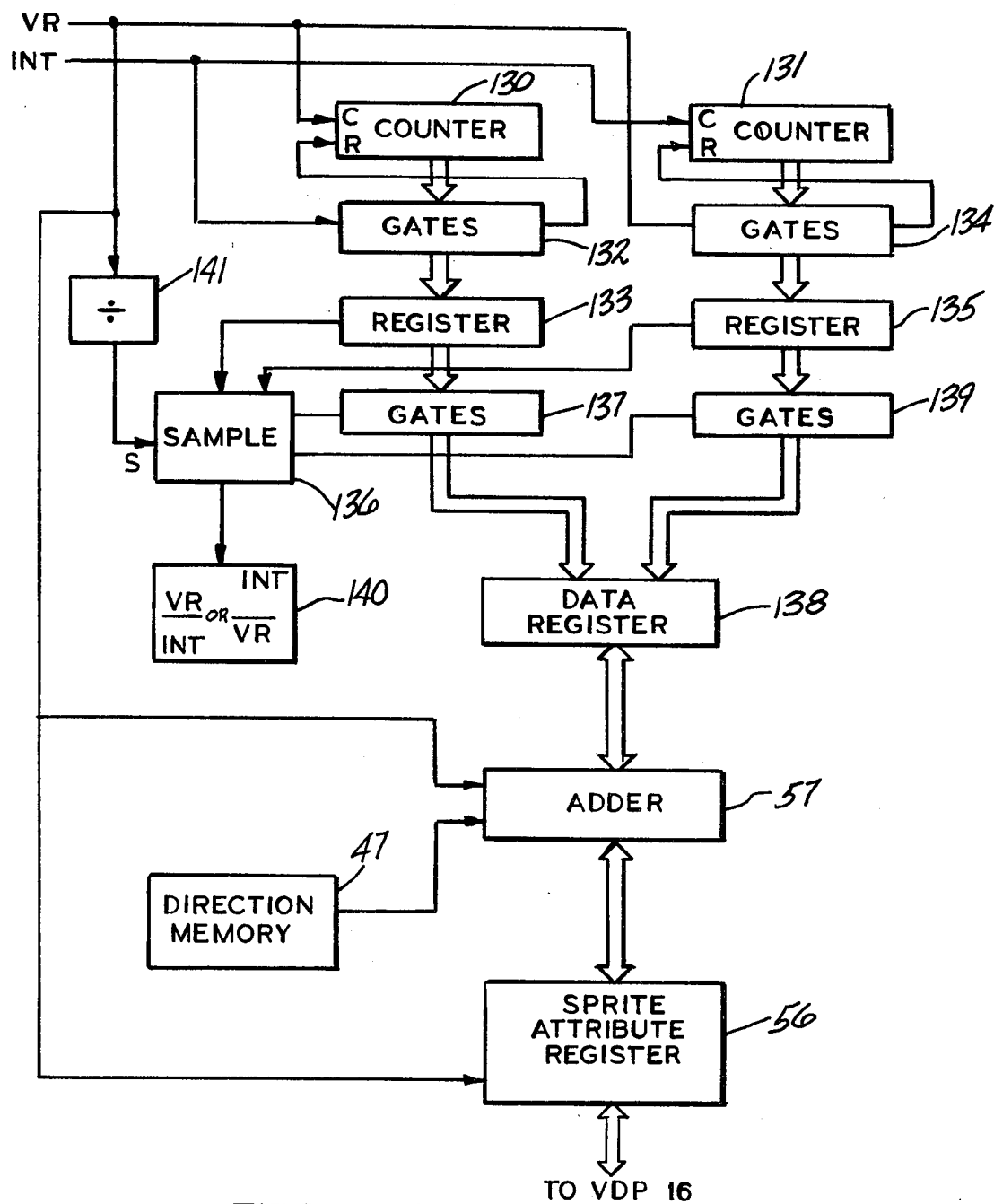
FIG. 14 is a block diagram of a circuit for determining rate and direction.

Reference is now made to FIG. 14, which discloses another technique of determining a velocity number and direction from the INT signal. To determine the rate of rotation of any of the rotatable members 71 or 104, INT pulses are compared with a reference clock signal, which may be the VR signal. The VR signal is applied as a clock signal C to a first counter 130, and as a reset signal R to a second counter 131. The INT signal is applied as a reset signal to counter 130 and as a clock signal to counter 131.

In operation, the VR signal will clock counter 130 until the occurrence of an INT signal. The INT signal transfers the content of counter 130 through gates 132 to a storage register 133. After the parallel transfer, the INT signal resets counter 130.

The INT signal will clock counter 131 until a VR signal occurs, which transfers the content of counter 131 through gates 134 to a storage register 135. The contents of either register 133 or 135 may then be transferred to a data register. This is determined by a sample circuit 136. Sample circuit 136 samples the contents of one of the registers 133 or 135 (both shown as being sampled). Assume register 135 is sampled circuit 136, and if it is zero, will apply a load signal to gates 137 to load the contents of register 133 into a data register 138. If the content of register 135 is not zero, then such content is loaded through gates 139 into data register 138.

Where the repetition rate of the INT pulses is less than that of VR, the number appearing in data register 138 will be inversely proportional to the speed of rotation of the rotatable member. Where the repetition rate of the INT pulses is greater than that of VR, the number appearing in register 138 will be directly proportional to the speed of rotation. Sample circuit 136 may sample one of registers 133 or 135 at a rate less than that of the VR signal. Such sampling signals S may be derived from any convenient timing signal in the system. As shown, the sample signal S is derived by division of the frequency of the VR signal by a counter 139. A memory 140 in the form of a flip-flop may store an indication of which of registers 133 or 135 contained a rate signal. The circuit of FIG. 14 may be formed in the central processing unit of the video game by the game program or may be external thereto. The game program may determine which function VR/INT or INT/VR will be used.

The number stored in data register 138 will be updated periodically and acted upon by the central processing unit of the video game to update the video display dependent upon the game program.

The number in register 138 may be utilized as previously described to be algebraically added to a sprite position attribute in adder 57. In this embodiment, the sign of the addition is determined from direction memory 47.

As shown above, the invention may be implemented using various devices operable by a game player. It is only necessary to provide a device which the player may manipulate to generate rate pulses. A chosen direction may be determined from the rate control device or from the direction controller. The logic may be implemented in various manners, as well as those specifically disclosed.

It may thus be seen that the objects of the invention are efficiently attained. Since certain features of the invention may be changed, and other modifications may become apparent to one skilled in the art, it is intended that the appended claims cover all modifications and embodiments of the invention which do not depart from the spirit and scope thereof.

Having thus described the invention, what is claimed is:

1. A method of operating a video game to control the velocity of movement of a game object on a video display where a digital representation of at least one game object is stored in addressable locations in an addressable memory and read out from memory locations for display in accordance with the beam location on the video display, comprising the steps of generating rate pulses having a repetition rate proportional to the desired velocity of the game object, generating clock pulses, applying said rate pulses to a binary counter, transferring the number in said counter to a storage register upon occurrence of a clock pulse, and periodically changing the address of said object in said memory in accordance with the number in said register.

2. The method of claim 1 where said clock signal is a video refresh signal, and the address of said object in said memory is changed as a function of said video refresh signal.

3. The method of claim 1 where said step of generating pulses comprises providing a player rotatable member and generating pulses at a rate proportional to rate of rotation of said member.

4. The method of claim 1 further including the step of detecting the direction of rotation of said member and changing the address of said object in said memory as a function of the direction of rotation of said member and the number in said counter.

5. A method of operating a video game to control the velocity of movement of a game object on a video display where a digital representation of at least one game object is stored in a randomly addressable location in an addressable memory and read out from memory locations for display in accordance with the beam location on the video display, comprising the steps of
generating rate pulses having a repetition rate proportional to the desired velocity of the object,
generating clock pulses,
applying said clock pulses to a counter,
transferring the count in said counter upon the occurrence of a rate pulse to a storage register and resetting said counter, whereby the number in said register is inversely proportional to the speed of the object,
applying said rate pulses to a second counter,
transferring the count in said counter to a second storage register upon the occurrence of a clock pulse and resetting said second counter, whereby the number in said second register is directly proportional to the speed of that object, and
utilizing the number in one of said registers to change the address location of the object in said memory.

6. The method of claim 5, further including the step of sampling the number in at least one of said register and said second register, transferring the count in said sampled register to a third register if the count is not zero, and transferring the count in the other of said register and said second register to said third register if the sampled count is zero.

7. The method of claim 5, further including the step of indicating if the number transferred to said third register is from said first or said second register.

8. The method of claim 5 where said step of utilizing comprises adding the number in said third register to an address attribute of the address of said object in said memory.

9. In a video game comprising a video display, a video display memory having a plurality of addressable locations for storing indicia indicative of an object in a video display, said game providing a periodic pulse signal, means for periodically reading out objects from addresses in said video memory in a predetermined order to form successive video display frames, and a player controller coupled to said processor; said controller including player operable means for generating rate pulse at variable repetition rates, means for counting one of said rate pulses and said periodic pulses as a function of the other to establish a numerical value, said numerical value being indicative of a desired velocity of movement of an object to be displayed on said video display in succeeding display frames and means responsive to said numerical value to change the address of a picture element in said memory in accordance with the rate of the generated pulses.

10. The video game of claim 9 where said player operated means comprises a rotatable member, means responsive to rotation of said member for generating the pulses of the train at a rate proportional to the speed of rotation of said members, means for determining the direction of rotation of said member, said means for changing address further being effective to change the address in accordance with the direction of rotation of said member.

11. The video game of claim 10 wherein said means for counting is a bi-directional binary counter, having incrementing and decrementing inputs, and said pulses are applied to said inputs in accordance with the direction of rotation of said members.

12. In a video game comprising a video display, a video display memory having a plurality of addressable locations for storing indicia indicative of an object in a video display, each address location being defined by vertical and horizontal address attributes, said game providing a periodic pulse signal, means for periodically reading objects from addresses in said video memory and displaying the objects in a predetermined order to form video display frames; player operable means for selecting a desired direction of movement of an object and generating rate pulses at variable repetition rates, means for counting the number of rate pulses as a function of the periodic pulses to establish a numerical value, said numerical value being indicative of a desired velocity of movement of an object to be displayed on said video display in succeeding display frames, means for adding said numerical value to an address attribute of the object as a function of the desired direction of movement of the object to change the address of the object in said memory.

13. The game of claim 12 where said counter is a bi-directional counter having incrementing and decrementing inputs, said rate pulses being applied to one of said inputs for a first selected direction of movement and applied to the other of said inputs for another selected direction of movement.

14. The game of claims 9 or 12 where said means for generating pulse comprises a player rotatable member and the direction of rotation determines the direction of movement of the object.

* * * * *

UNITED STATES PATENT AND TRADEMARK OFFICE
CERTIFICATE OF CORRECTION

PATENT NO. : 4,462,594
DATED : July 31, 1984
INVENTOR(S) : ERIC BROMLEY AND ROBERT A. SCHENCK It is certified that error appears in the above-identified patent and that said Letters Patent are hereby corrected as shown below:

IN THE CLAIMS

Column 10, Line 15 (Claim 4, line 1): After "claim", change "1" to -- 3 --.

Column 10, Line 34 (Claim 5, line 15): Change "speed" to -- velocity --.

Column 10, Line 37 (Claim 5, line 17): Before "counter", insert -- second --.

Column 10, Line 41 (Claim 5, line 21): Change "speed" to -- velocity --.

Column 10, Line 41 (Claim 5, line 21): Before "object", change "that" to -- said --.

Column 11, Line 5 (Claim 9, cont., Line 16): After "address of", delete "a".

UNITED STATES PATENT AND TRADEMARK OFFICE
CERTIFICATE OF CORRECTION

PATENT NO. : 4,462,594

DATED : July 31, 1984

INVENTOR(S) : ERIC BROMLEY AND ROBERT A. SCHENCK

It is certified that error appears in the above-identified patent and that said Letters Patent are hereby corrected as shown below:

Column 11, Line 6 (Claim 9, cont., Line 17): Change "picture element" to -- an object --.

Signed and Sealed this

Fifth Day of March 1985

[SEAL]

Attest:

DONALD J. QUIGG

Attesting Officer

Acting Commissioner of Patents and Trademarks